US011930036B2

(12) United States Patent
Kaimal et al.

(10) Patent No.: US 11,930,036 B2
(45) Date of Patent: *Mar. 12, 2024

(54) DETECTING ATTACKS AND QUARANTINING MALWARE INFECTED DEVICES

(71) Applicant: Pulse Secure, LLC, San Jose, CA (US)

(72) Inventors: Biju Kaimal, Bangalore (IN); Bandam Radha Shravan, Telangana (IN); Thiyagu Rajendran, Bangalore (IN); Clifford E. Kahn, Westford, MA (US)

(73) Assignee: Pulse Secure, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,724

(22) Filed: Aug. 31, 2022

(65) Prior Publication Data

US 2023/0007012 A1 Jan. 5, 2023

Related U.S. Application Data

(63) Continuation of application No. 16/718,909, filed on Dec. 18, 2019, now Pat. No. 11,483,339.

(60) Provisional application No. 62/941,592, filed on Nov. 27, 2019.

(51) Int. Cl.
*H04L 9/40* (2022.01)
*G06N 5/04* (2023.01)
*G06N 20/00* (2019.01)

(52) U.S. Cl.
CPC .............. *H04L 63/145* (2013.01); *G06N 5/04* (2013.01); *G06N 20/00* (2019.01); *H04L 63/105* (2013.01); *H04L 63/1416* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 10,972,508 B1* | 4/2021 | Dods | H04L 63/1433 |
| 11,032,303 B1* | 6/2021 | Efstathopoulos | G06F 16/285 |
| 2016/0219065 A1* | 7/2016 | Dasgupta | H04L 63/1441 |
| 2016/0301707 A1* | 10/2016 | Cheng | H04L 67/12 |
| 2019/0052604 A1* | 2/2019 | Coleman | H04L 63/1441 |
| 2020/0349169 A1* | 11/2020 | Venkatesan | G06F 16/215 |

* cited by examiner

*Primary Examiner* — Joseph P Hirl
*Assistant Examiner* — Hassan Saadoun

(57) ABSTRACT

Attacks on a network device, e.g. an IoT device, are detected by analyzing network traffic and subsequently quarantining or blocking the network device on the network to prevent lateral movement of malware. The techniques described herein relate to developing a baseline of network device activity corresponding with a network device during a learning period and comparing the baseline of network device activity with new network activity by the network device in order to identify potentially unusual network device activity by the network device. If unusual network activity is found, remedial actions such as quarantining the network device or restricting some access to a network may be initiated.

20 Claims, 5 Drawing Sheets

DETECTING ATTACKS AND QUARANTINING MALWARE INFECTED DEVICES

CROSS REFERENCE TO RELATED APPLICATION

This application claims the benefit of and priority to U.S. Prov. Pat. No. 62/941,592, filed Nov. 27, 2019, and U.S. patent application Ser. No. 16/718,909, filed Dec. 18, 2019. This application incorporates the disclosures of these applications by reference in their entireties.

FIELD

The disclosure relates to computer networks.

BACKGROUND

Network devices including Internet of Things (IoT) devices can be infected by malware or have Media Access Control (MAC) spoofing attacks performed against them. The lack of the security countermeasures on some network devices make them attractive vectors of infiltration into an enterprise network. Two common attack vectors that may be detected and acted upon are MAC spoofing and IoT malware. MAC spoofing occurs when the MAC address of a network service is spoofed on an attacker's computer. The network device may have been previously authenticated on the network using MAC authentication. The attacker can then replace the network device with, e.g., their laptop and gain unauthorized access to the network and use it as a launch pad for further incursions into the network. Malware on IoT devices is also becoming more common. Once the malware is on an IoT device, it can make network connections based on what the malware attacker instructs it to do.

SUMMARY

In general, the disclosure describes a method for detection of an attack on a network device (e.g., an IoT device) by analyzing network traffic and subsequently quarantining or blocking the network device on the network to prevent lateral movement of malware. The techniques described herein relate to systems, software, and methods for developing a baseline of network device activity corresponding with a network device during a learning period and comparing the baseline of network device activity with new network activity by the network device in order to identify potentially unusual network device activity by the network device. If unusual network activity is found, remedial actions such as quarantining the network device or restricting some access to a network may be initiated.

The techniques described herein can provide advantages over conventional systems. For example, the techniques can provide a technical solution to the technical problems posed by malware software by reducing or eliminating the impact that a malware-infected device, such as an IoT device, can have on a network. The techniques described herein have practical applications. For example, the techniques can be applied to network monitoring applications that monitor the network activity of network devices that have been discovered on a network. As an example of a further practical application, the techniques described herein can used in network policy management applications and network policy agents that establish and enforce network policies applicable to newly discovered network devices. As an additional example of a practical application, the techniques described herein can be utilized in anti-malware applications that monitor the network activity of network devices, and analyze the network traffic and subsequently quarantine or block the device on the network when unexpected network activity is detected.

In one example, a method includes receiving, from a first device on a network, incoming network traffic; comparing a network traffic baseline associated with the first device with the incoming network traffic; determining, based on the comparing, an anomaly type associated with the incoming network traffic; and changing access to the network by the first device according to an access restriction selected from a set of access restrictions, the access restriction corresponding to the anomaly type.

In another example, a system includes one or more processors; a data collector executable by the one or more processors to receive, from a first device on a network, incoming network traffic; and a traffic analyzer executable by the one or more processors to: receive, from the data collector, the incoming network traffic; compare a network traffic baseline associated with the first device with the incoming network traffic; determine, based on the comparing, an anomaly type associated with the incoming network traffic; and change access to the network by the first device according to an access restriction selected from a set of access restrictions, the access restriction corresponding to the anomaly type.

In another example, a computer-readable medium includes instructions for causing one or more processors to: receive, from a first device on a network, incoming network traffic; compare a network traffic baseline associated with the first device with the incoming network traffic; determine, based on the comparison, an anomaly type associated with the incoming network traffic; and change access to the network by the first device according to an access restriction selected from a set of access restrictions, the access restriction corresponding to the anomaly type.

The details of one or more examples are set forth in the accompanying drawings and the description below. Other features, objects, and advantages will be apparent from the description and drawings, and from the claims.

BRIEF DESCRIPTION OF DRAWINGS

Embodiments of the disclosure may be better understood by referencing the accompanying drawings.

DETAILED DESCRIPTION

In general, this disclosure describes a method for detection of attacks on a network device, e.g. an IoT device, by analyzing network traffic and subsequently quarantining or blocking the network device on the network to prevent lateral movement. In some aspects, attack vectors that are detected and acted upon include, among others, MAC spoofing and IoT malware. As described above, MAC spoofing occurs when the MAC address of a network service is spoofed on an attacker's computer. The network device may have previously authenticated on the network using MAC authentication. The attacker can replace the network device with their computing device (e.g., a laptop) and gain unauthorized access to the network and use it as a launch pad for further incursions into the network. IoT malware can establish network connections to other devices on a network based on what the malware attacker instructs the malware to do.

Existing methods for identifying MAC spoofing and/or malware attacks depend on active scanning techniques, like network messaging application protocol (nmap), to detect attacks such as MAC spoofing and use rule-based logic to detect network traffic that is non-compliant with the device. A technical problem with active scanning is that it can be defeated when an attacker uses a personal firewall on the attacking device to prevent the attacking device from being scanned. A technical problem with rules-based logic is that it does not account for changes in behavior of devices over time.

In some examples, a computing system using the techniques described herein may detect that an IoT device (e.g., network device 108) may be under attack by creating a baseline of the device network data traffic activity during a learning period and comparing subsequent network data traffic against the baseline of the device network data traffic after the learning period. The learning period may be long enough to capture a representative network data traffic pattern of the device being monitored and determine a normal traffic pattern for the device. The normal traffic pattern can include network data traffic patterns for network traffic data that is incoming to and outgoing from the device being monitored and may also include the source domain name, IP address or other identifier of the incoming network data traffic and the destination domain name, IP address or other identifier of the outgoing network data traffic. An example learning period may be, e.g. seven to thirty days, although in some aspects, this can be configured to be shorter or longer depending upon the device.

Figure 1:
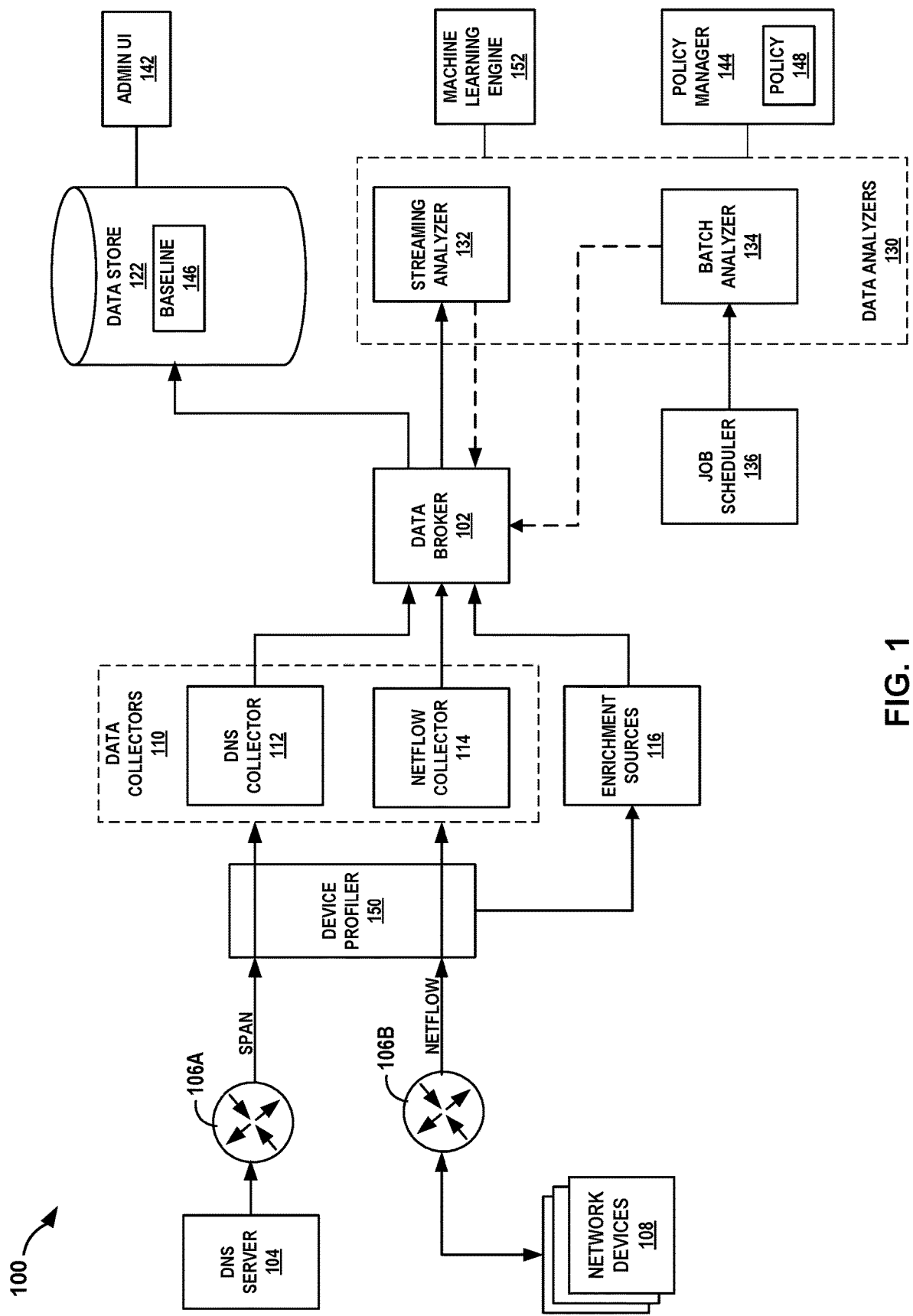
FIG. 1 is a block diagram illustrating an example system configured to detect attacks and quarantining malware-infected devices, according to techniques described herein.

FIG. 1 illustrates an example system 100 detecting attacks and quarantining malware infected devices according to aspects of the disclosure. In some aspects, system 100 may include data collectors 110 such as a DNS collector 112 or a NetFlow connector 114, that collect data from one or more network devices 108. In some aspects, the network devices 108 can include IoT devices such as cameras, printers, VoIP phones, sensors, actuators etc. IoT devices typically have limited processor and memory resources. As a result, an IoT device may not be able to implement a robust authentication scheme and thus may be more susceptible to a MAC spoofing attack. Further, the limited resources of an IoT device may prevent the device from running anti-malware software and are thus vulnerable to malware attacks.

System 100 can further include a data broker 102, a data store 122, and data analyzers 130 that may include streaming analyzer 132 and batch analyzer 134. In some aspects, data collector 110 can be a network appliance operated by a network security service provider. An example of such a network appliance is the Pulse Secure Appliance series of network appliances.

A plurality of data collectors 110 can be employed to collect data by interacting with external entities such as network switches, wireless network access points, network gateways, routers and various network appliances such as DNS server 104, authentication and authorization servers, or the like. The data collectors 110 may include software and hardware modules deployed by a network security service provider, e.g. deployed in private network connection devices 106A-106B (collectively, connection devices 106), such as network gateways, wireless network access points, network switches, routers or firewalls, or the like. In some examples, system 100 may collect data corresponding with domain name requests from a relevant DNS server 104. Additionally, network traffic flow data may be collected from the same network connection devices 108, e.g., private network gateways, wireless network access points, network switches, routers or firewalls, or the like. For example, a Netflow collector 114 may collect Netflow traffic data. Other data can also be collected by additional data collectors 110 when such data can provide useful information. For example, network traffic flow data from JFlow, sFlow and other network traffic analysis systems may be collected and used by system 100.

System 100 can include data broker 102 to manage data flow through the system 100. The data broker 102 can comprise a central router or server configured to receive relevant network data traffic metadata from one or more data collectors 110 and from one or more enrichment sources 116. As an example, an enrichment sources 116 can provide metadata related to network data traffic of similar network device types, device classes, devices having similar operating systems, a same manufacturer, or the like. As an example, device profiler 150 can analyze network traffic and determine metadata regarding a device. The metadata can include the device type (camera, VoIP phone, printer etc.), device class (video, audio, appliance etc.), the manufacturer of the device, an operating system for the device, and software versions of software executing on the device. After receiving data from the data collectors 110, the data broker 102 may modify or supplant the incoming data, e.g. by adding or modifying the collected data in a manner that makes the data easier to analyze or that increases the likelihood that the analysis will provide meaningful results.

In some examples, computing system 100 may establish or otherwise include a data store 122 to store collected data for recall, e.g., to store data corresponding with the baseline 146 (also referred to as network activity baseline) of device network data traffic activity during a learning period for a plurality of different network devices 108, device types, or the like. Additionally, the data from the data store 122 can be accessed by network security administrators and used to develop and implement network security policies 148 corresponding with the network devices 108 that have a baseline of device network data traffic activity during a learning period. Further, data from the data store 122 can be accessed by analytical resources, e.g. to compare subsequently monitored data of a network device 108 with the baseline 146 of device network data traffic activity during a learning period for the same network device, or device type in order to determine if a suspected anomaly in network data flow is of concern, or is a false positive anomaly detection. In addition, the data store 122 may be configured to roll over or discard collected data when warranted, e.g., after a time to live limit, after the monitoring processes has ended, or, e.g., when network policies for network device 108 or device type being monitored are employed that eliminate the need for further monitoring.

Data analyzers 130 are responsible for running algorithms on the incoming data to determine patterns of deviation that can be used to detect anomalies in behavior of the device 108. In some aspects, data analyzes 130 include two types of analytic jobs that can be run on the data. A streaming analyzer 132 can operate on a stream of data after it is collected and optionally enriched by the broker 102. A batch analyzer 134 can operate on the data that has been stored in the data store 122 and may be run periodically. For example, the batch analyzer 132 can generate aggregations on the data. A jobs scheduler 136 can be used to schedule runs of a batch analyzer 134.

In some aspects, data analyzers 130 can analyze the incoming data with respect to a predetermined set of features such as domain names, IP addresses, port, packet rates, data rates etc. In some aspects, the data analyzers can employ a machine learning engine 152 that can be trained during a learning period to learn appropriate features of network data that can be used to indicate malware or MAC spoofing. The features learned during the learning period can then be used by the machine learning engine 152 to make anomaly predictions on new incoming data received from network devices 108 to determine if the network devices have been infected with malware or have had their MAC addresses spoofed by an attacking device.

Figure 2:
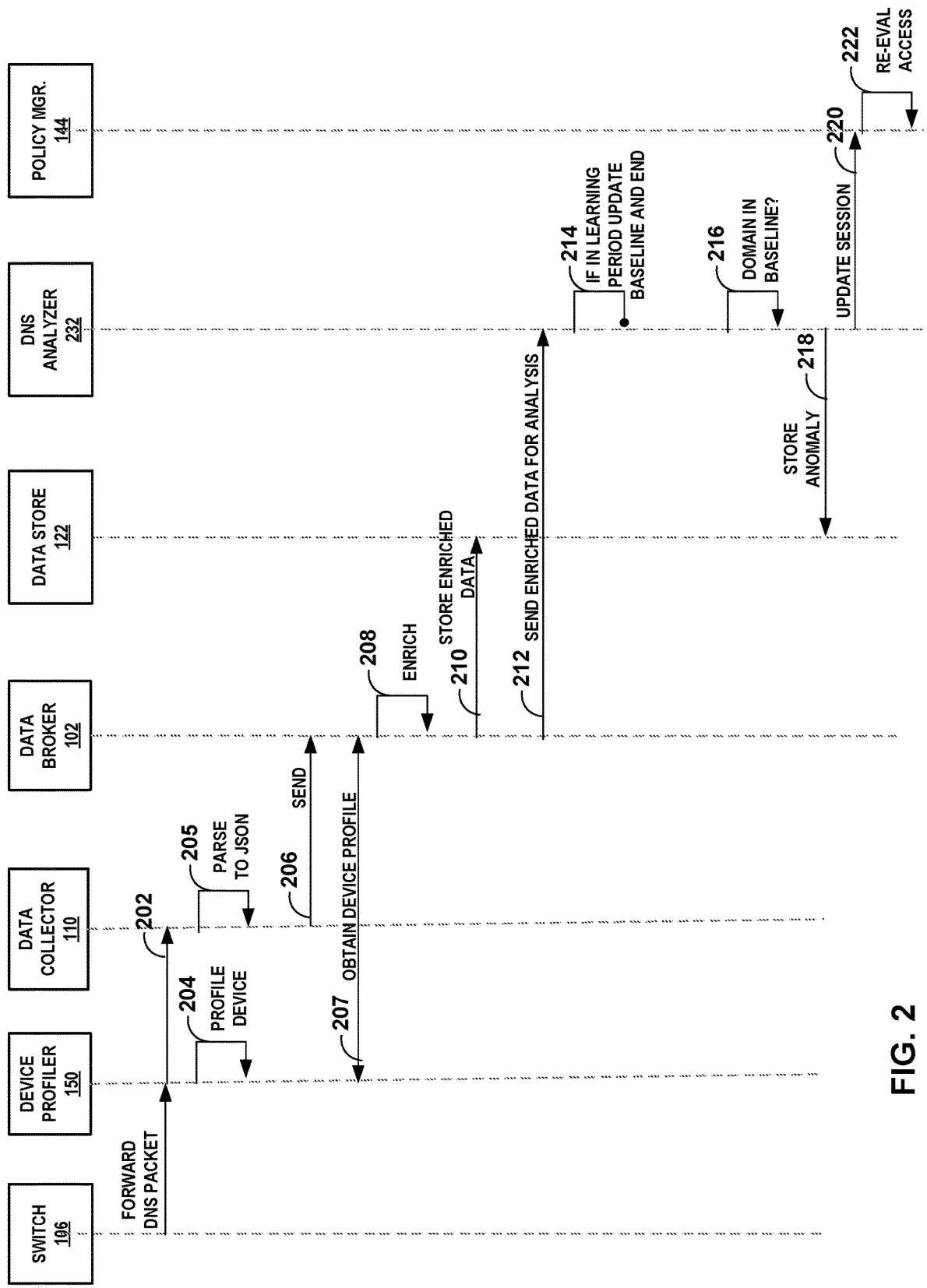
FIG. 2 depicts a sequence diagram of an example workflow illustrating operations for collecting, processing and analyzing data corresponding with network device activity associated with a Domain Name System (DNS), according to techniques described herein.

FIG. 2 depicts a sequence diagram of an example workflow illustrating operations for collecting, processing and analyzing data corresponding with network device activity associated with a DNS server 104 according to techniques described herein. The example illustrated in FIG. 2 shows how the different sub-systems of system 100 can interact to perform analysis of DNS traffic to detect anomalies. In some aspects, DNS packets are forwarded by the network switch 106 over a Switched Port Analyzer (SPAN) port to the device profiler 150 and the DNS collector 110 (202). The device profiler can analyze the incoming data and determine a device profile for the device (204). For example, the device profile may include the type of device, the manufacturer of the device, the OS executed by the device, and software versions of software executing on the device. The DNS collector 110 parses the DNS traffic data (205) and serializes to JavaScript Object Notation (JSON) format and sends the parsed DNS traffic data to the data broker 102 (206).

In some aspects, the data broker 102 can obtain the device profile from the device profiler 150 (207). In some aspects, the data broker 102 may enrich the parsed DNS data with data in the device profile or from other enrichment sources (208) and publish the enriched, parsed DNS data to the data store 122 (210). Further, the data broker 102 may send the enriched, parsed DNS data to a DNS data analyzer 232 (212).

DNS analyzer 232 receives the JSON data, checks if device is in learning period, where the learning period can be the time when device was discovered plus a predetermined or configurable learning duration. If the network device 108 is in a learning period, the DNS analyzer 232 can update baseline 146 and return (214). However, the network device 108 is no longer in a learning period, the DNS analyzer 232 can check to determine if the domain name associated with the network traffic provided by the network device 108 appears in the baseline data 146 (216). If the domain name is in the baseline data 146, then there is no anomaly. If the domain name is not in the baseline data, then the DNS analyzer 232 can generate an anomaly and store data regarding the anomaly in database 122 (218).

If an anomaly is generated, the DNS analyzer 232 can update session attributes to indicate the anomaly (e.g., set an anomaly flag) and type of anomaly (220). In some aspects, a session can start when a device is first connected on the network, and last until the device is removed. The indication of an anomaly can cause a policy manager 144 to perform a role re-evaluation (222). The role re-evaluation may cause the endpoint (e.g., the network device 108) to be placed in a remediation role. In some aspects, the remediation role can indicate that the network device's access to the network is altered in some way that may restrict the devices access to the network. In some aspects, the endpoint (e.g., network device or an attacking device) may be restricted to a remediation VLAN by reconfigured the endpoint with a different IP address with limited access.

Figure 3:
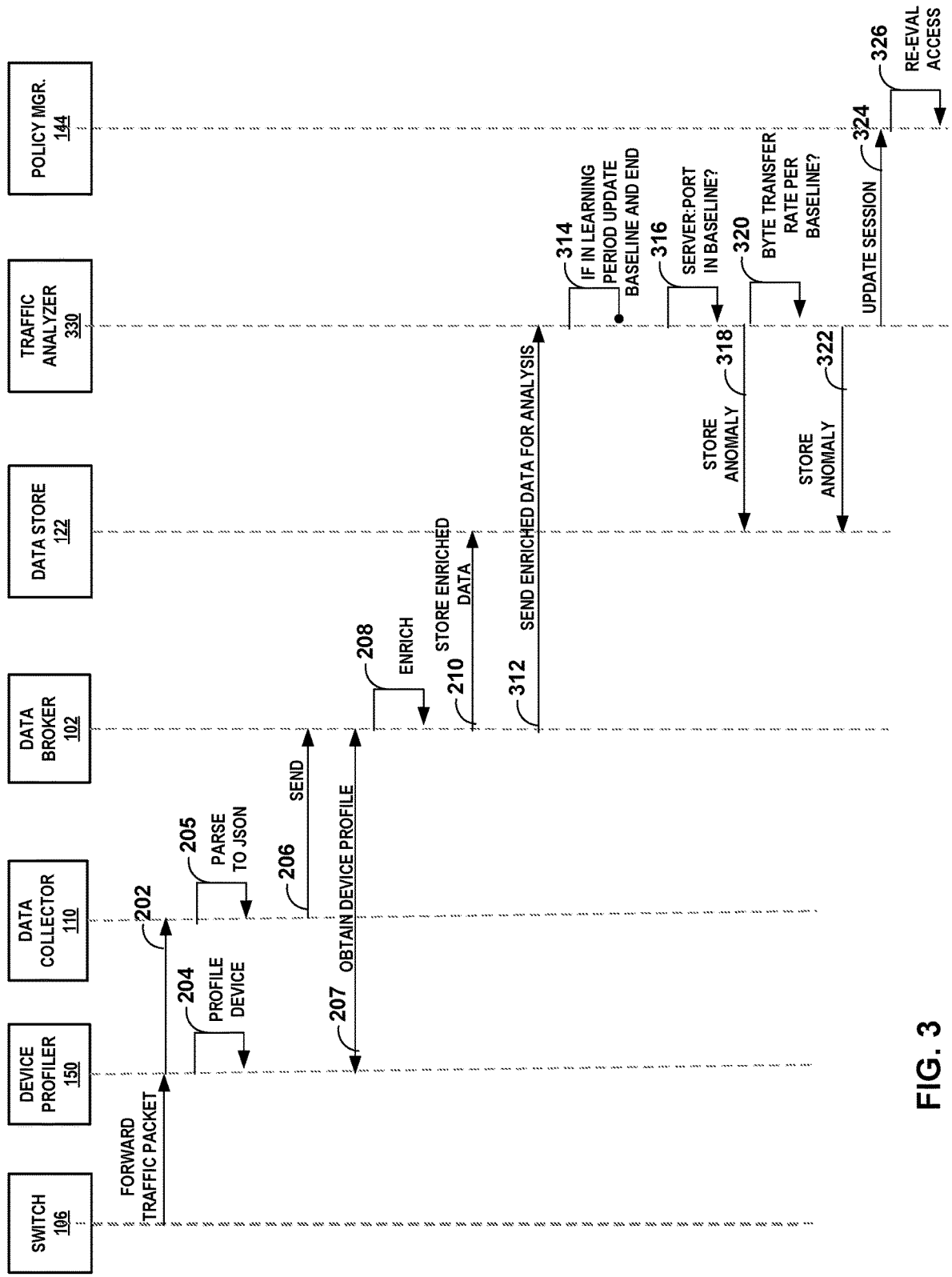
FIG. 3 depicts a sequence diagram of an example workflow illustrating operations for detecting false positive anomalies and allowing a quarantined network device to renew its access to the network, according to techniques described herein.

FIG. 3 depicts a sequence diagram of an example workflow illustrating operations for detecting false positive anomalies and allowing a quarantined network device to renew its access to the network according to techniques described herein. The example sequence illustrated in FIG. 3 shows how the sub-systems interact to process network traffic data as follows. The initial operations in the sequence are the same or similar to the sequence of operations described with respect to FIG. 2. In some aspects, DNS packets are forwarded by the network switch 106 over a SPAN port to the device profiler 150 and the DNS collector 110 (202). The device profiler can analyze the incoming data and determine a device profile for the device (204). For example, the device profile may include the type of device, the manufacturer of the device, the OS executed by the device, and software versions of software executing on the device. The DNS collector 110 parses the DNS traffic data (205) and serializes to JSON format and sends the parsed DNS traffic data to the data broker 102 (206).

In some aspects, the data broker 102 can obtain the device profile from the device profiler 150 (207). In some aspects, the data broker 102 may enrich the parsed DNS data with data in the device profile or from other enrichment sources (208) and publish the enriched, parsed DNS data to the data store 122 (210).

The data broker 102 may send the enriched, parsed DNS data to a traffic analyzer 330 (312). Network traffic analyzer 330 can be part of a set of one or more streaming analytics jobs 132 (FIG. 1). Network traffic analyzer 330 can receive the JSON data and check if the network device 108 is in learning period, which in some aspects, can be the time when device was discovered plus a predetermined or configurable learning duration. If in the learning period, the network traffic analyzer 330 can update the baseline for the network device and return (314). If the network device is not in the learning period, the network traffic analyzer 330 can check if server address and port combination in is in the baseline data (316). In some aspects, if the server address and port combination is not in the baseline data, the network traffic analyzer can generate an anomaly and store the anomaly in data store 122 (318). In some aspects, the network traffic analyzer determines if the byte transfer rate (or packet rate) for a predetermined or configured time interval is within baseline limit (320). If the byte transfer rate for the configured time interval is within the baseline limit, then there is no anomaly. If byte transfer rate for the configured time interval is not within the baseline limit, the network traffic analyzer 330 can generate an anomaly and store data regarding the anomaly in database 122 (322).

As is the case with the DNS analyzer 232 described in sequence diagram of FIG. 2, when an anomaly is generated (operations 318,322), the traffic analyzer 330 can update session attributes to indicate the anomaly (e.g., set an anomaly flag) and type of anomaly (324). The indication of an anomaly can cause a policy manager 144 to perform a role re-evaluation (326). The role re-evaluation may cause the endpoint (e.g., the network device 108 or spoofing attacker) to be placed in a remediation role. In some aspects, the remediation role can indicate that the network device's access to the network is altered in some way that may restrict the devices access to the network.

Some anomalies that are detected by a data analyzer 110 such as DNS analyzer 232 and network traffic analyzer 330 may be false positives. In this case, the endpoint (e.g., network device) can be allowed to regain access back to the original network. For example, a system administrator can clear the anomaly associated with the device which can cause the session to be updated and the policy manager 144 to re-evaluate the roles. Once the endpoint role is reassigned, the network device can regain normal access back on the network.

Figure 4A:
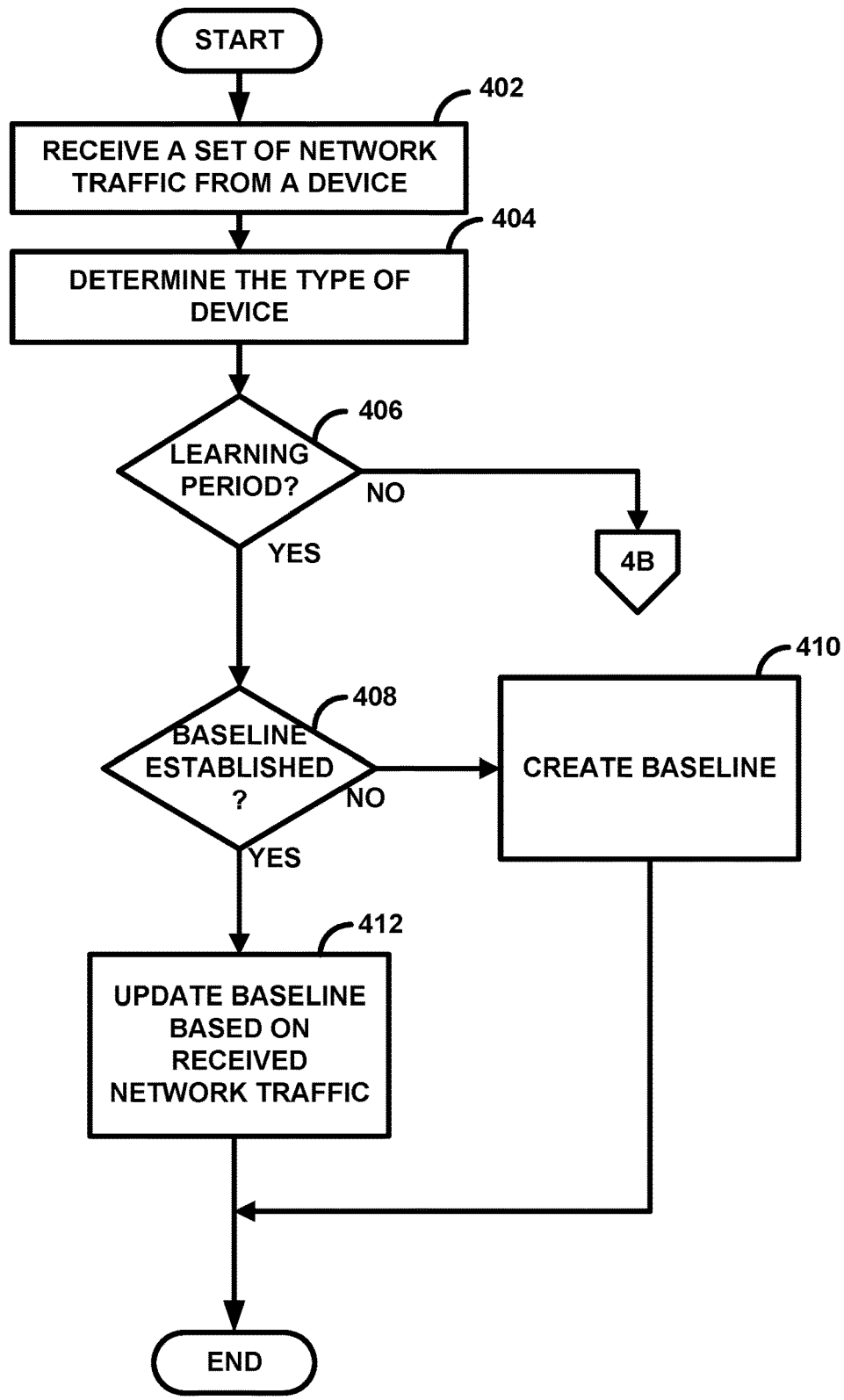
FIGS. 4A and 4B are flowcharts illustrating example operations of a method for quarantining a network device that is exhibiting anomalous network behavior.
Figure 4B:
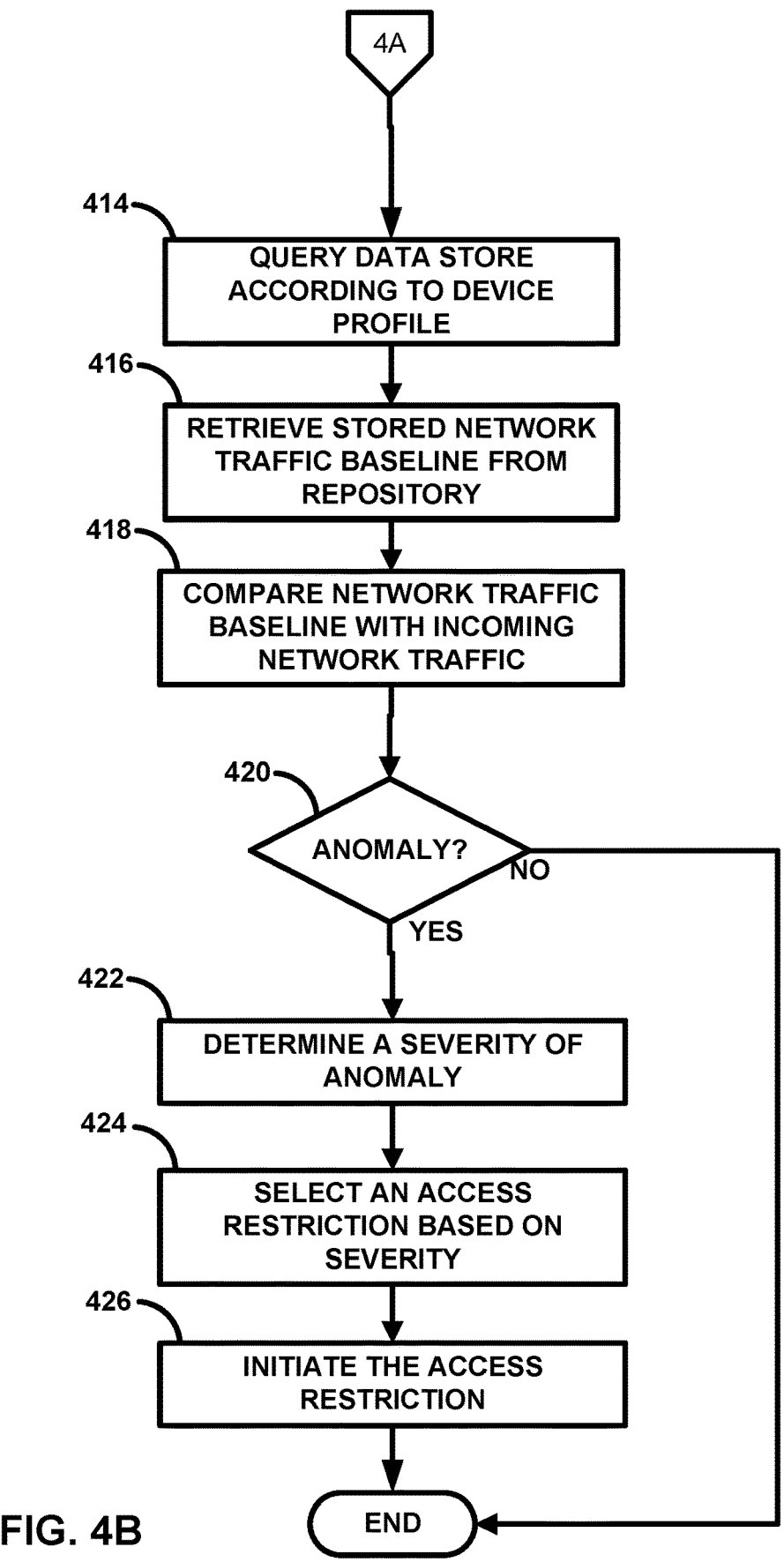

FIGS. 4A and 4B are flowcharts illustrating example operations of a method for quarantining a network device that is exhibiting anomalous network behavior. The operations illustrated in the flowcharts may be performed, for example, by a data analyzer 130 such as a DNS analyzer 232 or traffic analyzer 330 (e.g., a Netflow analyzer).

FIG. 4A is a flowchart illustrating operations performed when a data analyzer receives a set network traffic (402). The data analyzer can determine the type of device, for example, using device profile data received from a device profiler (404). The analyzer can determine if the device providing the data is in a learning period (406). If the device is not in a learning period, then the operations of the flowchart of FIG. 4B can be performed ("NO" branch of 406).

If the device is in a learning period ("YES" branch of 406), then the analyzer can determine if a baseline has been established for the device, type of device, and/or class of device (408). If a baseline doesn't exist ("NO" branch of 408), then a baseline is created for the device (410). In some aspects, the baseline may be created by determine a particular set of predetermined features from the set of incoming network traffic. For example, device type, domain names of source or destination devices communicating with the device of interest, packet rates, data rates, OS version, software version etc. may be used to create a baseline profile for the device. Similarly, a baseline profile for the device type or device class may be created using similar features.

In some aspects, the features used to create a baseline profile can be determined using a machine learning engine that can train a machine learning model to use features learned during the learning period to create a baseline profile.

If a baseline already exists ("YES" branch of 408), then the baseline can be updated based on the new incoming network traffic (412). For example, the traffic analyzer can retrieve a previously crated baseline profile from the data store based on the device identifier (e.g., MAC address), device type and/or device class, and update the retrieved baseline profile based on the new incoming data. For example, the predetermined features may be updated based on the incoming data, or the machine learning model may be updated by a machine learning engine based on the incoming data.

FIG. 4B is a flowchart illustrating operations that take place after the learning period for device has passed. The incoming data (or metadata) may be used to query the data store to retrieve the device profile (414). The query can use a device type, device class, or device identifier to retrieve an existing baseline profile from data store 122 (416).

Features of the incoming data can be compared to the features stored in the baseline profile (418). For example, in the case where the baseline profile stores predetermined features, the feature values can be extracted from the incoming network data and compared with the feature values in the baseline profile. In the case where the baseline profile includes a machine learning model, the incoming data can be run through the model and the resulting predicted features can be used to determine if an anomaly exists (420).

As an example, domain names or IP address/Port combinations that appear in the incoming network traffic can be compared with domain names or IP address/port combinations that are in the baseline profile. If a domain name appears in the incoming network traffic that is not in the baseline profile, then it may be likely that an attacker has spoofed the MAC address of network device. Similarly, if the packet rate or data rate associated with incoming network traffic is different from the baseline profile, an attacker may be using tools that generate a different amount of network traffic or different packet rate, which can indicate that malware is installed on the network device or an attacker has spoofed the MAC address of the network device and is using attack tools that generate a different amount of network traffic or traffic at a different rate than is expected from a non-spoofed or non-infected device.

If an anomaly is not detected ("NO" branch of 420) no further operations need be performed. Optionally, the baseline profile can be updated based on the new incoming network traffic if desired.

If an anomaly is detected ("YES" branch of 420), the traffic analyzer determines a severity of the anomaly (422). In some aspects, different anomalies can have different severities. For example, a packet rate that is slightly higher than the baseline profile may be associated with a lower severity than an anomaly that indicates the network device is communicating with hosts that are not in the baseline profile. An access restriction may be selected according to the severity (424). For example, the network device may be assigned a different role that limits the access of the network device to other devices on the network.

The access limitation may result in the network device being completely quarantined from other devices or may result in the network device having access to fewer network devices than in its originally assigned role. In some aspects, the role may not limit access, but may cause some or all accesses to be logged for later inspection. After the new role has been assigned to the network device, the system can initiate access restriction through the enforcement of policies associated with the new role (426).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:
1. A method comprising:
   receiving, from a first device on a network, incoming network traffic;
   receiving previous network traffic from a second device having the same device type as the first device on an isolated network for a predetermined time period,
   creating a network traffic baseline based on the previous network traffic;
   comparing the network traffic baseline associated with the incoming network traffic;
   determining, based on the comparison, an anomaly type associated with the incoming network traffic; and
   changing access to the network by the first device according to an access restriction selected from a set of access restrictions, wherein the access restriction corresponds to the anomaly type.
2. The method of claim 1, further comprising:
   analyzing the incoming network traffic to determine a device type of the first device;
   identifying a plurality of devices having the device type; and
   associating the network traffic baseline with the plurality of devices.
3. The method of claim 1, further comprising:
   analyzing the incoming network traffic to determine a device class of the first device; and
   identifying a plurality of devices having the device class; and
   associating the network traffic baseline with the plurality of devices.
4. The method of claim 1, further comprising determining, by a machine learning engine and from the received previous network traffic, a machine learning model, wherein:
   the comparing the network traffic baseline to the incoming network traffic includes applying the machine learning model to the incoming network traffic to determine an anomaly prediction; and
   the anomaly type is determined according to the anomaly prediction.
5. The method of claim 1, wherein the changing access to the network is based at least partially on an anomaly severity of an anomaly identified in the incoming network traffic.
6. The method of claim 1, wherein:
   the access restriction is associated with a role of the first device; and
   the changing access includes changing the role of the first device.
7. The method of claim 1, wherein the changing access includes one or more or a combination of:
   quarantining the first device from the network;
   removing, from the first device, access to a subset of devices on the network; and
   logging network traffic of the first device within the network.
8. The method of claim 1, wherein the network traffic baseline is associated with the device type of the first device, wherein the method further comprises:
   determining the device type of the first device based on the incoming network traffic;
   querying a data store for the network traffic baseline matching the device type; and
   retrieving the network traffic baseline from the data store.
9. The method of claim 1, wherein the comparing the network traffic baseline with the incoming network traffic includes one or more or a combination of:
   comparing a domain name of the network traffic baseline with a corresponding domain name of the incoming network traffic;
   comparing a packet rate of the network traffic baseline with a corresponding packet rate of the incoming network traffic; and
   comparing a data rate of the network traffic baseline with a corresponding data rate of the incoming network traffic.
10. A non-transitory computer-readable medium having encoded therein programming code executable by one or more processors to perform or control performance of operations comprising:
    receiving, from a first device on a network, incoming network traffic;
    receiving previous network traffic from a second device having the same device type as the first device on an isolated network for a predetermined time period,
    creating a network traffic baseline based on the previous network traffic;
    comparing the network traffic baseline associated with the incoming network traffic;
    determining, based on the comparison, an anomaly type associated with the incoming network traffic; and
    changing access to the network by the first device according to an access restriction selected from a set of access restrictions, wherein the access restriction corresponds to the anomaly type.
11. The non-transitory computer-readable medium of claim 10, wherein the operations further comprise:
    analyzing the incoming network traffic to determine a device type of the first device; and
    identifying a plurality of devices having the device type; and associating the network traffic baseline with the plurality of devices.

12. The non-transitory computer-readable medium of claim 10, wherein the operations further comprise:
analyzing the incoming network traffic to determine a device class of the first device;
identifying a plurality of devices having the device class; and
associating the network traffic baseline with the plurality of devices.

13. The non-transitory computer-readable medium of claim 10, wherein:
the operations further comprise determining, by a machine learning engine and from the received previous network traffic, a machine learning model;
the comparing the network traffic baseline to the incoming network traffic includes applying the machine learning model to the incoming network traffic to determine an anomaly prediction; and
the anomaly type is determined according to the anomaly prediction.

14. The non-transitory computer-readable medium of claim 10, wherein the changing access to the network is based at least partially on an anomaly severity of an anomaly identified in the incoming network traffic.

15. The non-transitory computer-readable medium of claim 10, wherein:
the access restriction is associated with a role of the first device; and
the changing access includes changing the role of the first device.

16. The non-transitory computer-readable medium of claim 10, wherein the changing access includes one or more or a combination of:
quarantining the first device from the network;
removing, from the first device, access to a subset of devices on the network; and
logging network traffic of the first device within the network.

17. The non-transitory computer-readable medium of claim 10, wherein:
the network traffic baseline is associated with the device type of the first device; and
the operations further comprise:
determining the device type of the first device based on the incoming network traffic;
querying a data store for the network traffic baseline matching the device type; and
retrieving the network traffic baseline from the data store.

18. The non-transitory computer-readable medium of claim 10, wherein the comparing the network traffic baseline with the incoming network traffic includes one or more or a combination of:
comparing a domain name of the network traffic baseline with a corresponding domain name of the incoming network traffic;
comparing a packet rate of the network traffic baseline with a corresponding packet rate of the incoming network traffic; and
comparing a data rate of the network traffic baseline with a corresponding data rate of the incoming network traffic.

19. A system comprising:
one or more processors; and
a non-transitory computer-readable medium including:
a data collector executable by the one or more processors to receive, from a first device on a network, incoming network traffic, and to receive previous network traffic from a second device having the same device type as the first device on an isolated network for a predetermined time period; and
a traffic analyzer executable by the one or more processors to:
receive, from the data collector, the incoming network traffic and the previous network traffic;
create a network traffic baseline based on the previous network traffic;
compare the network traffic baseline with the incoming network traffic;
determine, based on the comparison, an anomaly type associated with the incoming network traffic; and
change access to the network by the first device according to an access restriction selected from a set of access restrictions, wherein the access restriction corresponds to the anomaly type.

20. The system of claim 19, wherein the device profiler is further executable by the one or more processors to determine, based on analyzing the incoming network traffic, a device class of the first device, wherein the network traffic baseline is associated with a plurality of devices having the device class.

* * * * *